Patented Aug. 30, 1938

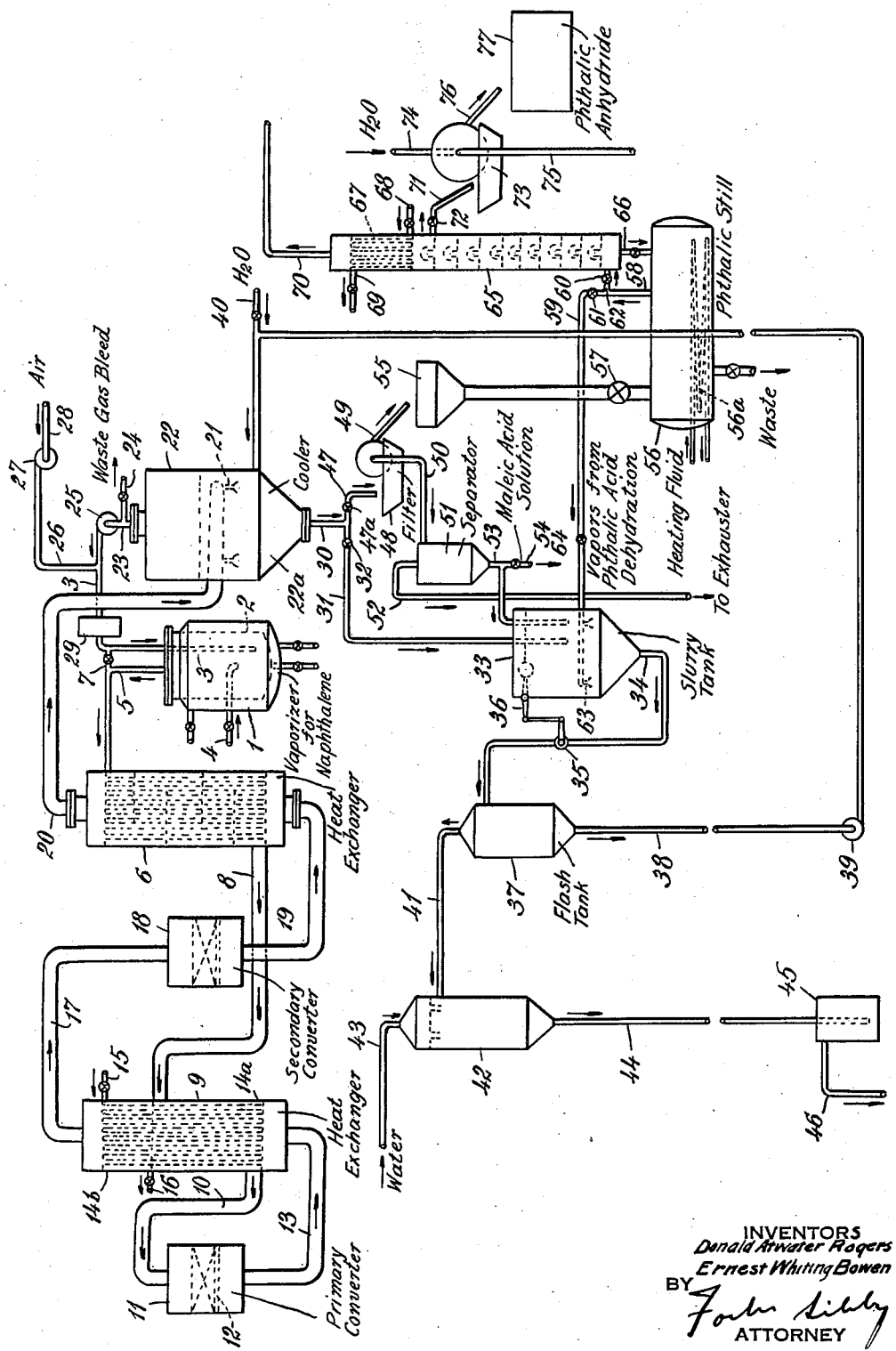

2,128,323

UNITED STATES PATENT OFFICE 2,128,323

PHTHALIC ACID MANUFACTURE

Donald Atwater Rogers, Petersburg, and Ernest Whiting Bowen, Prince George County, Va., assignors to The Solvay Process Company, New York, N. Y., a corporation of New York Application April 15, 1937, Serial No. 137,036

6 Claims. (Cl. 260—525)

This invention relates to the treatment of phthalic acid solutions and is particularly concerned with reducing the foaming tendency of phthalic acid solutions and slurries, such as those produced by contact of the reaction gases from a vapor phase catalytic oxidation of naphthalene with an aqueous phthalic acid slurry or solution.

Although cooling of hot reaction gases containing phthalic anhydride by means of an aqueous phthalic acid slurry has been found to be an efficient method for removing phthalic anhydride from such gases, the bubbling of the gases through the slurry causes foaming, particularly when oxidation conditions depart somewhat from best operation. This leads to excessive product losses in carry-over of entrained liquor by the gases or else to undesirable design conditions such as provision of excessive vapor space above the slurry.

In accordance with the present invention it has been found that by passing the slurry of phthalic acid through a flash chamber under moderate vacuum, i. e. an absolute pressure below about 250 millimeters of mercury, the tendency of the liquid to foam is greatly diminished. The residue from the flashing step may then be employed for cooling additional gases with the formation of substantially less foam than resulted from use of the slurry prior to flashing. It is, of course, unnecessary to withdraw all of the slurry from the cooling chamber or scrubber at one time and the process is preferably carried out by continuously withdrawing a portion of the slurry, circulating it through the flash chamber, and returning it to the main body of slurry in the scrubber.

The process of the present invention is particularly applicable to processes of recovering phthalic acid wherein it is necessary to cool the slurry employed for cooling the gases. Examples of such processes are those involving the use of pressures (in the phthalic acid or anhydride separator) substantially above atmospheric or recirculation of reaction gases from which phthalic anhydride has been removed. When such gases are brought into contact with the phthalic acid slurry, there is normally insufficient evaporation of water from the solution to effect cooling of the gases to the desired temperature and consequently it is necessary to supplement or substitute this cooling effect by direct or indirect cooling of the slurry. Since the slurry may be effectively cooled by evaporation of a portion thereof, the flashing step of the present invention may be operated in such a manner as not only to reduce the tendency of the liquid to foam but at the same time to cool the liquid sufficiently to maintain the desired temperature in the phthalic acid recovery system.

The following description of a preferred embodiment of the invention, apparatus for the operation of which is shown in the appended drawing, serves to demonstrate further the nature of our invention.

In the drawing, numeral 1 designates a naphthalene vaporizer of any suitable type. The conventional vaporizer is shown having a steam jacket 2, a gas inlet 3 near the bottom thereof, and a naphthalene or hydrocarbon inlet 4. Vapor conduit 5 leads from vaporizer 1 to heat exchanger 6, which may be of any suitable construction, providing indirect heat exchange between a pair of gas streams. A valved bypass 7 for gases is provided so that the vapor content of the mixture may be regulated by adding oxidizing gas in the event the gases leaving the vaporizer 1 contain more than the desired ratio of naphthalene vapor to oxidizing gas. From heat exchanger 6, vapor conduit 8 leads to a second heat exchanger 9 of the same or different type. A conduit 10 leads from heat exchanger 9 to a primary converter 11.

Converter 11 may be of any suitable construction arranged for the passage of gases into intimate contact with solid catalyst and may be provided with one or a number of trays 12 for supporting the catalyst bed. The converter, of course, should be designed for operation at the elevated temperature and pressure at which it is preferred to carry out the process. Preferably the walls of the converter are suitably insulated to avoid heat loss and prevent local cooling of the catalyst near these walls. The catalyst within the converter may consist of a bed of crushed alundum or silica brick having disposed thereon vanadium oxide in known manner.

From converter 11, a conduit 13 leads to heat exchanger 9, which serves the dual function of reducing the temperature of the reaction gases and heating the gas passing to the converter.

The heat exchanger 9 is illustrated as composed of two sections, 14a and 14b, although these sections may, of course, be entirely separate heat exchangers. Inlet 15 and outlet 16 are provided for flow of cooling fluid through section 14b of exchanger 9. From section 14b of heat exchanger 9 vapor conduit 17 leads to secondary converter 18 of the same general type as converter 11. This converter has an outlet conduit 19 leading to heat exchanger 6, which, as now will be apparent, serves to transfer heat from the hot reaction gas stream to the cooler gases passing to the converter 11. From heat exchanger 6 vapor conduit 20 leads through a distributor 21 into cooler 22.

Cooler 22 may be of any suitable construction providing intimate contact between hot reaction gases and aqueous phthalic acid slurry. The gas may be bubbled up through a body of liquid as in the case of the device illustrated or alternatively the liquid may be sprayed into the gas or streams of liquid and gas may be passed in intimate relation.

Removal of phthalic anhydride from the reaction gases in the above system takes place in cooler 22 into which aqueous phthalic acid slurry is introduced. This serves not only to cool the gases but to scrub them so that practically all of the phthalic anhydride will be removed therefrom. The phthalic anhydride reacts with the water in the cooler to form phthalic acid. Any maleic anhydride contained in the gases is simultaneously scrubbed out by the water and forms an aqueous maleic acid solution.

As illustrated, the cooling chamber 22 comprises a shell adapted to contain a liquid and having gas outlet conduit 23 at the top thereof and a sloped bottom 22a to permit withdrawal of slurry through outlet conduit 30 without substantial separation of solid from liquid. Inlet conduit 20 is provided with the distributor 21 for uniformly distributing the gases beneath the surface of liquid in the cooler. In some cases it may be desirable to provide insulation or steam jacketing around the exterior of the portions of conduit 20 within the cooler in order to avoid cooling of this conduit to such an extent that phthalic anhydride would condense on the interior surfaces of the conduit and cause clogging.

Gas conduit 23 having a valved bleed line 24 leads to recirculating pump 25, which in turn is connected to gas conduit 3. On conduit 3 a branch conduit 26 from compressor 27 is provided. This compressor serves to introduce oxidizing gas, for example air, into the system through an inlet 28. A preheater 29 may be provided on the inlet line 3 to raise the temperature of entering air sufficiently to avoid cooling naphthalene below its melting point. It will be understood, however, that normally the heat of compression of the gases will be sufficient for this purpose.

From the bottom of cooler 22 an outlet pipe 30 and branch pipe 31 provided with a valve 32 lead to a slurry tank 33 which may to advantage be constructed similar to cooler 22 for reasons to be hereinafter more fully set forth. From tank 33 a liquid withdrawal pipe 34 having a valve 35, which may be controlled by any suitable actuating means to maintain a constant liquid level in the tank, for example a float 36, leads to a flash tank 37. From the bottom of the flash tank 37 a liquid return pipe 38, having a pump 39 thereon, leads to the cooler 22. A suitable water inlet 40 may be provided on line 38. From the top of the flash tank a vapor line 41 leads to a suitable evacuating means which, as shown in the drawing, may be a jet evacuator and condenser 42 having a water inlet 43 at the top thereof and a liquid outlet 44 at the bottom thereof. The outlet 44 may be sufficiently long to permit flow of liquid therethrough in opposition to air pressure or a pump may be provided for drawing it through this line. At the bottom of pipe 44 a liquid seal 45 with outlet 46 for suitable liquid disposal is illustrated.

Outlet conduit 30 from the direct contact cooler 22 is shown provided with a second withdrawal pipe 47 having a valve 47a thereon. Withdrawal pipe 47 leads to suitable separating means, such as a drum filter 48. The drum filter is provided with the customary doctor 49 for scraping solid therefrom and with a liquid outlet 50 leading to a separator 51 for eliminating entrained air. An air line 52 from the separator leads to a suitable exhauster (not shown) for supplying suction to the filter 48. At the bottom of the separator 51 a liquid withdrawal pipe 53, having a valved branch 54, is shown. Pipe 53 leads to the tank 33 for return of liquid from the filter to the cooling system. The branch 54 is a bleed off for maleic acid solution. Doctor 49 of the drum filter is arranged so as to conduct solid phthalic acid to a hopper 55 on the phthalic acid still 56. The hopper 55 may be provided with a suitable star valve 57 or other suitable means for controlling introduction of phthalic acid into the still 56.

The phthalic acid still may be of any convenient construction and is shown as a simple distillation vessel provided with a heating coil 56a containing any suitable hot fluid such as steam, hot oil, etc. It preferably should be suitably insulated to avoid heat loss and promote uniformity of operation. The still has a vapor offtake 58 with a branch 59 and a branch 60. These branches are equipped with valves 61 and 62. Branch 59 leads to the phthalic acid slurry tank 33 through a suitable distributor 63. The line 59 also may be provided with a check valve 64 for preventing back flow of liquid from the slurry tank to the phthalic acid still. Branch 60 leads to the base of a rectification column 65.

Column 65 may be of any suitable construction, such as a plate column, a bell and tray column, or a packed column, and has at the bottom thereof a valved liquid return line 66 and at the top a suitable heat exchanger 67 which may be provided with a liquid inlet 68 and outlet 69. This heat exchanger may be in the nature of a waste heat boiler, water being introduced at 68 and steam being withdrawn at 69. By controlling the steam pressure, the temperature at the top of the column may be regulated. A vacuum connection 70 is provided at the top of the column. From the top plate of the column a liquid withdrawal line 71 having a valve 72 is provided for the withdrawal of phthalic anhydride. This withdrawal line may lead to apparatus for placing the phthalic anhydride in suitable physical condition for transportation or use, or may lead to further purification apparatus as desired. As shown in the drawing, it conducts liquid phthalic anhydride to a flaker 73 having an inlet and outlet 74 and 75 for cooling water and a doctor 76 for scraping solid phthalic anhydride from the drum and conducting it to a storage bin 77.

It will be understood that parts of the equipment, which it is desired to maintain at elevated temperature, may be provided with suitable insulation to avoid excessive heat losses.

For the preparation of phthalic anhydride by the vapor phase catalytic oxidation of naphthalene, the process may be carried out in the above apparatus as follows:

A body of naphthalene is maintained in molten condition in vaporizer 1 by means of heat applied by steam jacket 2. Additional naphthalene is introduced through inlet 4 to compensate for its removal by evaporation. Air is supplied through compressor 27, pipe 26, heat exchanger 29, and pipe 3 to vaporizer 1 at a pressure around 3 atmospheres absolute. In the vaporizer 1 it bubbles up through the body of molten naphthalene and absorbs vapors therefrom. The resultant naphthalene-air mixture passes out from vaporizer 1 through conduit 5. A part of the air may be directed through by-pass 7 so as to reduce the naphthalene to air ratio to between 1:280 and 1:400. The resultant mixture, which may be at a temperature around 80° C., passes through conduit 5 to heat exchanger 6 and through conduit 8 to heat exchanger 9, where it is heated by indirect heat exchange with hot reaction gases to a temperature around 330° to 400° C.

It may be noted here that in beginning operation of the above apparatus, air may be preheated in heater 29 to a high temperature, say around 300° C. until a supply of hot reaction gases is available as the source of heat. During this heating up, of course, most if not all the air will by-pass the naphthalene vaporizer as otherwise an excess naphthalene vapor content would be obtained.

The hot reaction mixture passes from heat exchanger 9 through conduit 10 into primary converter 11, which may contain a vanadium oxide catalyst supported on a tray 12, for example a catalyst composed of about 10 parts of vanadium oxide disposed on 90 parts of crushed silica brick.

In the catalytic converter the naphthalene is oxidized to phthalic anhydride with resultant rise of the temperature of the reaction mixture to between 525° and 550° C. The catalytic converter is operated adiabatically, i. e. without any substantial heat flow thereto or therefrom except that introduced or withdrawn by the gas stream and the temperature regulation is secured by controlling the ratio of naphthalene to entering gases.

The hot reaction gases are withdrawn from the primary converter and passed through conduit 13 to section 14a of heat exchanger 9 where they give up a portion of their heat to ingoing naphthalene air mixture. From this section of the heat exchanger they pass through a second section 14b in which any suitable cooling means is provided and by which their temperature is regulated to between about 350° and about 400° C. At this temperature they pass into secondary converter 18 which may contain a bed of oxidation catalyst similar to that in the preliminary converter and in this converter any naphthoquinone produced by the preliminary oxidation is substantially converted to phthalic anhydride.

The reaction gases are withdrawn from secondary converter 18 at a temperature between about 390° and about 430° C. and are passed through conduit 19 into heat exchanger 6 where they are cooled by indirect heat exchange with ingoing naphthalene-vapor air mixture to a temperature around 200° C. At this temperature the reaction gases, still containing in vapor phase the phthalic anhydride product of the oxidation, pass through conduit 20 and distributor 21 into cooler 22 at a point well below the surface of a body of phthalic acid slurry in water containing 5% or more, and preferably between about 15% and about 30% of solid phthalic acid as crystalline slurry and maintained at a temperature between about 50° C. and about 60° C. The gases bubble up through the body of liquid and are cooled thereby to about the temperature of the cooling liquid. Phthalic anhydride reacts with the water to form phthalic acid and is retained in the cooling liquid in crystalline form. Any maleic anhydride present in the gases is simultaneously absorbed or dissolved (as maleic acid) and retained in the solution.

The gases freed from phthalic anhydride and maleic anhydride pass through outlet conduit 23 while yet at a pressure above about two atmospheres absolute, and are recirculated by means of pump 25 to the naphthalene vaporizer 1. A portion of the gases is bled off at 24 and a corresponding portion of air is introduced through inlet 28 by means of air compressor 27.

The pressure of the gases in the system is preferably maintained so that the gases pass through the catalytic converter at about 2 and about 5, preferably around 3, atmospheres absolute pressure. It is of advantage to minimize pressure losses in the system so that a reduction of pressure of only a few tenths of one atmosphere takes place through the entire system.

The ratio of additional air to recirculated gas may be varied within wide limits. It is preferred, however, to adjust the bleed off of tail gas at 24 and the introduction of additional air at 28 so as to maintain the oxygen content between 5% and 10% by volume in the gases leaving converter 18 and the additional air supplied may be only about ⅛th to about 1/10th of the total volume of gases passing through the converter. It will be noted that although the reaction mixture passing through the primary converter has been referred to as a mixture of naphthalene and air, once the apparatus is in proper operation, the mixture will comprise a small portion of added air and a relatively large portion of tail gases which in addition to oxygen and nitrogen will contain gaseous products of the reaction.

Phthalic acid slurry is withdrawn through outlet pipe 30 and pipe 31 to the tank 33 and passes thence through pipe 34 to flash tank 37 maintained under vacuum, say between about 25 and about 250 millimeters of mercury absolute pressure, by means of the jet evacuator 42. Pressure reduction of the slurry may take place in any suitable type of outlet from pipe 34 into flash tank 37, for instance a nozzle or a spray head (not shown). Regulating valve 35, if located far from the outlet, may undesirably reduce the pressure at this point, hence this valve may be arranged as a part of the outlet nozzle or spray head and may be designed to control the size of the nozzle or spray head apertures. The sudden release of pressure on the liquid in the flash tank releases any occluded gases and at the same time evaporates a part of the water composing the slurry. This may cause cooling of the slurry to around 20° to 40° C. The cooled slurry is returned via pipe 38 to the body of liquid in cooler 22 where it mingles with the slurry contained therein.

The amount of liquid passing through the above circuit may be controlled by the pump 39 so that a substantially constant temperature of about 50° to 60° C. is maintained in the body of liquid in cooler 22. At the same time head of liquid in the cooler may be maintained substantially constant by control of valve 32 manually or automatically. Various other combinations of control may be used of course. Thus pump 39 may be regulated automatically to provide a constant liquid level in flash tank 37 and the rate of cooling may be controlled by adjustment of valve 32. By opening this valve the liquid level in tank 33 will be raised and this in turn will open valve 35 and increase the rate of circulation of liquid. Should the level in tank 22 become low, make-up water may be introduced at 40. All these regulations may be effected by means of thermostats and constant level control devices, if desired.

A small portion of the liquid withdrawn through outlet 30, say 1% to 5% thereof, is withdrawn through outlet pipe 47 to a drum filter 48 where liquid is separated from solid by suction, liquid passing through pipe 50 to air separator 51. The suction is maintained on the filter by an exhauster, not shown, connected to line 52. The main portion of this liquid, free from solid phthalic acid, is returned via pipe 53 to the tank 33. A minor portion thereof may be bled off through bleed line 54 for recovery of maleic acid from solution or for other suitable disposal, the amount of bleed being controlled so that maleic acid will not be present in the solution or slurry in cooler 22 in sufficient quantity to exist in solid phase under the conditions of filtration. Solid phthalic acid collects on the drum filter and is scraped therefrom by doctor 49 and conducted to hopper or bin 55 from whence it may be passed through valve 57 into a phthalic acid still 56.

The still illustrated is designed for intermittent operation and the hopper 55 provides storage for phthalic acid while a preceding charge is being treated in the still. When sufficient phthalic acid has been introduced into still 56 to constitute a charge therefor, the introduction of additional acid through valve 57 is discontinued and steam is passed through coil 56a to dehydrate the phthalic acid. During this operation the valves on lines 60 and 66 are kept closed and valve 61 is opened so that vapors from the still pass through conduits 58 and 59 to distributor 63 within the slurry tank 33. Here the vapors bubble up through the slurry with the result that they are washed free from any phthalic acid which they may contain.

When the charge of phthalic acid is completely dehydrated, which may be indicated by rise of temperature in the still appreciably above 190° C. when the still is operated at approximately atmospheric pressure, valve 61 is closed and the valves on lines 60 and 66 are opened so that vapors may pass from the still up through column 65 and reflux liquid may return through 66 to the still. The temperature in the still is then further raised and vacuum is applied through connection 70 to reduce the pressure to around 1.7 pounds absolute in the column.

Phthalic anhydride vapors pass up through column 65 and are rectified by countercurrent contact with phthalic anhydride condensate formed in the condenser 67. The temperature at the top tray of the column is controlled by suitable adjustment of the cooling fluid in condenser 67 so that a substantially pure phthalic anhydride product may be withdrawn in liquid phase through outlet 71. Thus a temperature of about 200° C. may be maintained at the top of the column and the withdrawal of phthalic anhydride may be regulated so as to provide ample reflux liquid to flow down through the column.

The liquid phthalic anhydride withdrawn may be passed to a flaker 73 and cooled and solidified as a film by indirect heat exchange with cooling water passing through the drum of the flaker, the film of phthalic anhydride being scraped from the drum by doctor 76 and conducted to a suitable storage container 77.

We claim:

1. The method of inhibiting foaming of a phthalic acid solution having a tendency to foam, which comprises passing a stream of the solution into a flash chamber maintained at an absolute pressure below about 250 millimeters of mercury.

2. In the method of removing phthalic anhydride or acid vapor from hot gases by contact of the gases with an aqueous phthalic acid slurry or solution wherein a substantial tendency to foam is possessed by said slurry or solution, the improvement which comprises passing the slurry or solution into a flash chamber maintained at an absolute pressure below about 250 millimeters of mercury whereby its tendency to foam is diminished.

3. In the removal of phthalic anhydride or acid from hot gases by contact with an aqueous phthalic acid slurry, the improvement which comprises withdrawing the slurry from contact with the gases and passing it into a chamber maintained at an absolute pressure less than about 250 millimeters of mercury to effect flash vaporization of a portion of the water from the slurry, and returning residual slurry again into contact with the hot gases.

4. In the removal of phthalic anhydride or acid from hot gases resulting from the vapor phase catalytic oxidation of naphthalene by contact of the gases with an aqueous phthalic acid slurry maintained at a temperature above about 50° C., the improvement which comprises withdrawing phthalic acid slurry from contact with the gases and passing a stream of the slurry while yet at an elevated temperature into a chamber maintained at an absolute pressure less than about 250 millimeters of mercury to effect flash vaporization of a portion of the water from the slurry and reduction of temperature of residual slurry, and returning residual slurry again into contact with the hot gases.

5. In the removal of phthalic anhydride or acid from hot gases resulting from the vapor phase catalytic oxidation of naphthalene by contact of the gases with an aqueous phthalic acid slurry maintained at a temperature above about 50° C. and a pressure above about 2 atmospheres absolute, the improvement which comprises withdrawing phthalic acid slurry from contact with the gases, separating phthalic acid therefrom, passing a stream of the slurry while yet at an elevated temperature into a chamber maintained at an absolute pressure between about 25 millimeters and about 250 millimeters of mercury to effect flash vaporization of a portion of the water from the slurry and reduction of temperature of residual slurry, and returning residual slurry again into contact with the hot gases.

6. In the removal of phthalic anhydride or acid from hot gases resulting from the vapor phase catalytic oxidation of naphthalene by contact of the gases with an aqueous phthalic acid slurry maintained at a temperature above about 50° C. and a pressure above about 2 atmospheres absolute, the improvement which comprises withdrawing phthalic acid slurry from contact with the gases, dividing the slurry into two portions, separating solid phthalic acid from one portion, mixing the resulting solution with the other portion, passing a stream of the resultant slurry while yet at an elevated temperature into a chamber maintained at an absolute pressure between about 25 millimeters and about 250 millimeters of mercury to effect flash vaporization of a portion of the water from the slurry and reduction of temperature of residual slurry, and returning residual slurry again into contact with the hot gases.

DONALD ATWATER ROGERS.
ERNEST WHITING BOWEN.